(12) United States Patent
Nakatomi et al.

(10) Patent No.: US 9,189,150 B2
(45) Date of Patent: Nov. 17, 2015

(54) INFORMATION PROCESSING DEVICE, INFORMATION PROCESSING METHOD, AND COMPUTER-READABLE MEDIUM THAT DETERMINE AN AREA OF A DISPLAY SCREEN TO WHICH AN INPUT OPERATION BELONGS

(71) Applicants: Masashi Nakatomi, Tokyo (JP); Yuuji Kasuya, Kanagawa (JP)

(72) Inventors: Masashi Nakatomi, Tokyo (JP); Yuuji Kasuya, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 153 days.

(21) Appl. No.: 13/900,973

(22) Filed: May 23, 2013

(65) Prior Publication Data

US 2013/0335369 A1    Dec. 19, 2013

(30) Foreign Application Priority Data

Jun. 15, 2012  (JP) .................................. 2012-135392

(51) Int. Cl.
*G06F 3/0488*    (2013.01)
*G06F 3/023*    (2006.01)

(52) U.S. Cl.
CPC ............ *G06F 3/04883* (2013.01); *G06F 3/023* (2013.01); *G06F 2203/04803* (2013.01)

(58) Field of Classification Search
CPC .................. G06F 3/023; G06F 3/04–3/04897; G06F 2203/04803
See application file for complete search history.

(56) References Cited

U.S. PATENT DOCUMENTS

| 7,092,669 B2 | 8/2006 | Sakai et al. |
| 2004/0219501 A1* | 11/2004 | Small et al. .................... 434/317 |
| 2012/0113460 A1* | 5/2012 | Oda ............................. 358/1.15 |
| 2012/0229392 A1* | 9/2012 | Morita .......................... 345/173 |

FOREIGN PATENT DOCUMENTS

| JP | 2002-229427 | 8/2002 |
| JP | 2002-268617 | 9/2002 |
| JP | 2002-278700 | 9/2002 |
| JP | 2003-241872 | 8/2003 |
| JP | 2008-033393 | 2/2008 |
| JP | 4282690 | 3/2009 |
| JP | 2009-129223 | 6/2009 |
| JP | 2009-129224 | 6/2009 |
| JP | 2009-140382 | 6/2009 |

* cited by examiner

*Primary Examiner* — Larry Sternbane
(74) *Attorney, Agent, or Firm* — Oblon, McClelland, Maier & Neustadt, L.L.P.

(57) ABSTRACT

An information processing device includes an input operation function identification unit configured to identify an input operation and a function performed on a display screen including at least two areas; an area determination unit configured to determine an area among the at least two areas of the display screen to which the input operation belongs; a function process unit configured to execute a process of the function corresponding to the input operation, with respect to the area determined by the area determination unit; and a display output unit configured to display, on the display screen, a result obtained by the process executed by the function process unit.

9 Claims, 18 Drawing Sheets

FIG.5A

| FIRST AREA  |                  |
|-------------|------------------|
| SECOND AREA | X<100 OR Y<100   |

FIG.5B

| FIRST AREA  |                    |
|-------------|--------------------|
| SECOND AREA | X<100              |
| THIRD AREA  | X≥100 AND Y<100    |

| AREA NUMBER | PRESENT PAGE NUMBER |
|---|---|
| FIRST AREA | 1 |
| SECOND AREA | 3 |
| ... | ... |

FIG.10

| STROKE ID | AREA ID | PAGE ID | POINT COORDINATES |
|---|---|---|---|
| 1 | 1 | 1 | (10,10),(10,11),(11,14),····· |
| 2 | 1 | 1 | ····· |
| 3 | 1 | 1 | ····· |
| 4 | 1 | 2 | ····· |
| 5 | 2 | 1 | ····· |
| 6 | 2 | 1 | ····· |
| 7 | 1 | 3 | ····· |

INFORMATION PROCESSING DEVICE, INFORMATION PROCESSING METHOD, AND COMPUTER-READABLE MEDIUM THAT DETERMINE AN AREA OF A DISPLAY SCREEN TO WHICH AN INPUT OPERATION BELONGS

BACKGROUND OF THE INVENTION

1. Field of the Invention

The present invention relates to an information processing device including a display device and an information processing method.

2. Description of the Related Art

Conventionally, there is known a technology of opening two windows in one screen displayed on a display device of an information processing device, and separately performing page operations for the respective windows. Specifically, in each of the separate windows, characters are written, lines and drawings are drawn, the written characters and drawn lines and drawings are moved, and pages are switched in each window.

Furthermore, Patent Document 1 discloses an education support system that is one kind of information processing device. The education support system includes an instructor-use terminal device and a student-use terminal device. The display control unit of the student-use terminal device includes a means for dividing the screen, displaying a display image of the instructor-use terminal device in a part of the screen, and displaying a unique image in another part of the screen. Accordingly, in one part of the divided screen, the display image of the instructor-use terminal device is displayed, and the student can display a unique screen in the other part and write a memorandum, etc., in the other part.

Patent Document 1: Japanese Laid-Open Patent Publication No. 2002-229427

SUMMARY OF THE INVENTION

The present invention provides an information processing device and an information processing method, in which one or more of the above-described disadvantages are eliminated.

A preferred embodiment of the present invention provides an information processing device and an information processing method, by which characters/drawings can be drawn across plural areas obtained by dividing a screen such that the areas can be separately switched, the characters/drawings drawn across areas that are not switched can be left unmodified in the screen when any one of the plural areas is switched, and characters and drawings can be easily moved across areas.

According to an aspect of the present invention, there is provided an information processing device including an input operation function identification unit configured to identify an input operation and a function performed on a display screen including at least two areas; an area determination unit configured to determine an area among the at least two areas of the display screen to which the input operation belongs; a function process unit configured to execute a process of the function corresponding to the input operation, with respect to the area determined by the area determination unit; and a display output unit configured to display, on the display screen, a result obtained by the process executed by the function process unit.

According to an aspect of the present invention, there is provided an information processing method including identifying an input operation and a function performed on a display screen including at least two areas; determining an area among the at least two areas of the display screen to which the input operation belongs; executing a process of the function corresponding to the input operation, with respect to the area determined by at the determining; and displaying, on the display screen, a result obtained by the process executed at the executing.

BRIEF DESCRIPTION OF THE DRAWINGS

Other objects, features and advantages of the present invention will become more apparent from the following detailed description when read in conjunction with the accompanying drawings, in which:

FIG. 5A shows an example of conditions stored in an area condition storage unit of the information processing device according to the first embodiment of the present invention, and FIG. 5B shows another example of conditions stored in the area condition storage unit of the information processing device according to the first embodiment of the present invention;

FIG. 10 shows an example of information relevant to strokes stored in a stroke storage unit of the information processing device according to the second embodiment of the present invention;

DETAILED DESCRIPTION OF THE PREFERRED EMBODIMENTS

A description is given, with reference to the accompanying drawings, of a first embodiment of the present invention.

First Embodiment

Example of Configuration of Screen

Figure 1A:
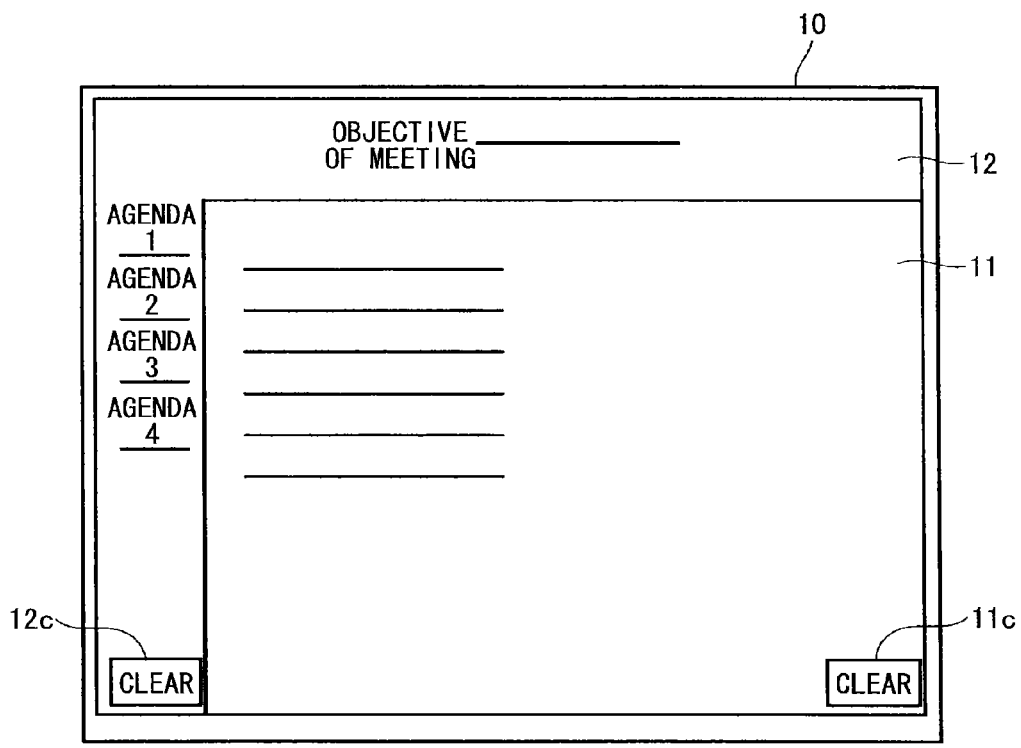
FIG. 1A illustrates an example of a screen displayed on a display device of an information processing device according to a first embodiment of the present invention.
Figure 1B:
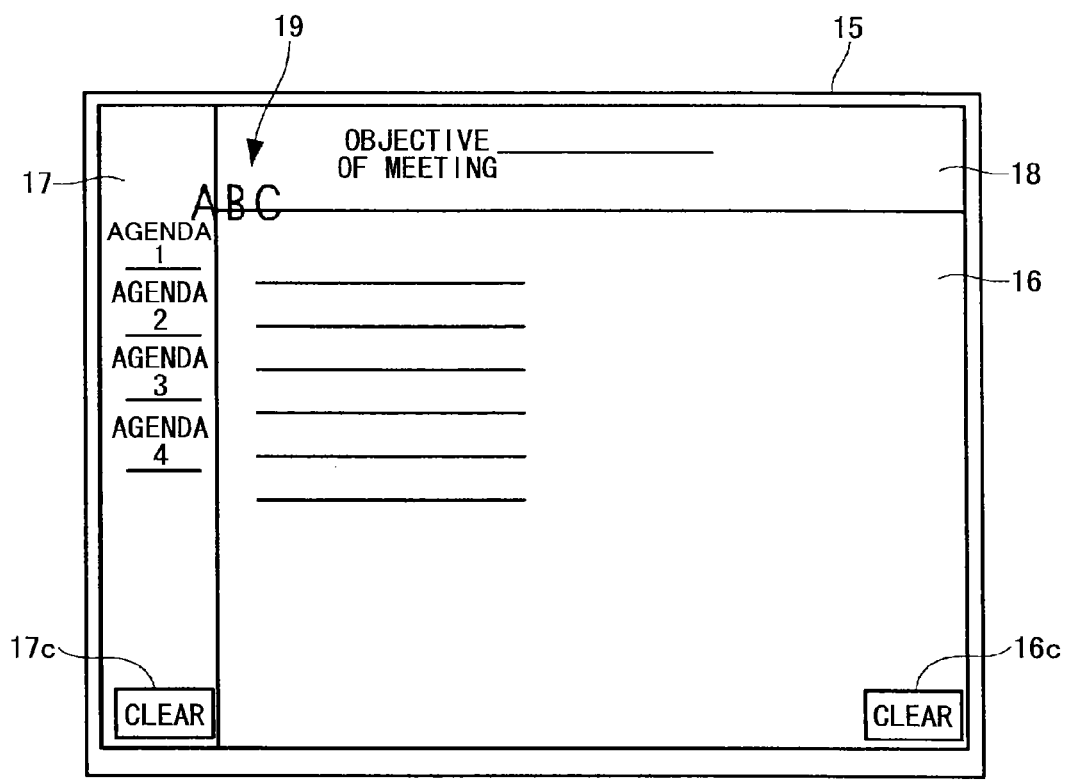
FIG. 1B illustrates another example of a screen displayed on a display device of an information processing device according to the first embodiment of the present invention.

FIG. 1A illustrates an example of a screen displayed on a display device 21 (see FIG. 2) of an information processing device 20 (see FIG. 2) according to a first embodiment of the present invention. FIG. 1B illustrates another example of a screen displayed on the display device 21 of the information processing device 20 according to the first embodiment of the present invention. As the display device 21 according to the present embodiment, an electronic blackboard having a touch panel to which handwriting can be input is illustrated; however, the present invention is not so limited. For example, the display device may be an electronic device such as a tablet terminal.

For example, as illustrated in FIG. 1A, the display device 21 of the information processing device 20 according to the present embodiment displays a display screen 10 that is partitioned by an L-shaped line on a surface of an electronic blackboard. Specifically, the display screen 10 includes a wide first area 11 on the bottom side for drawing contents relevant to the agenda being discussed, and a narrow second area 12 occupying the left side and the top side for listing the agenda items of the meeting and for indicating the objective of the meeting. The display device 21 of the information processing device 20 according to the present embodiment is described as including a touch panel. However, operations may be input not only directly to the touch panel, but by operating a cursor or up/down/left/right arrow keys of a keyboard to activate a function icon in a screen or to draw lines.

FIG. 1B illustrates a display screen 15 of another example. The display screen 15 includes a first area 16, a second area 17, and a third area 18, which are divided by a T-shaped line. The large first area 16 on the bottom side is for drawing contents relevant to the agenda being discussed, the vertically long, narrow small second area 17 on the left side is for listing the agenda items of the meeting, and the horizontally long, narrow third area 18 at the top side is for indicating the objective of the meeting.

For example, when the user runs his finger along a touch panel of the display device 21 displaying the display screen 10 or the display screen 15 shown in FIG. 1A or 1B, an input operation function identification unit detects the movement of the finger and the size of the contact area, and displays a drawing according to the detected movement and size of the contact area, as described below in detail. For example, as shown in the display screen 15 of FIG. 1B, a character string 19 "ABC" can be drawn across the first area 16, the second area 17, and the third area 18. Furthermore, an icon of a clear button 11c, 12c, 16c, and 17c is provided in each area of the screen, and when the user touches the clear button with his finger in a manner as to press the button, all of the drawn contents in the area corresponding to the touched clear button can be erased. For example, when the character string 19 "ABC" is determined as belonging to the third area 18, even if the clear button 16c or 17c of the first area 16 or the second area 17 is pressed, the character string 19 "ABC" is not erased, as described below in detail. Input of information is not limited to using a finger; any other means may be used as long as information can be input, such as a pen referred to as a stylus. Furthermore, in the present specification, lines, characters, and figures including the character string 19, may be referred to as strokes.

Configuration Example of Information Processing Device

Figure 2:
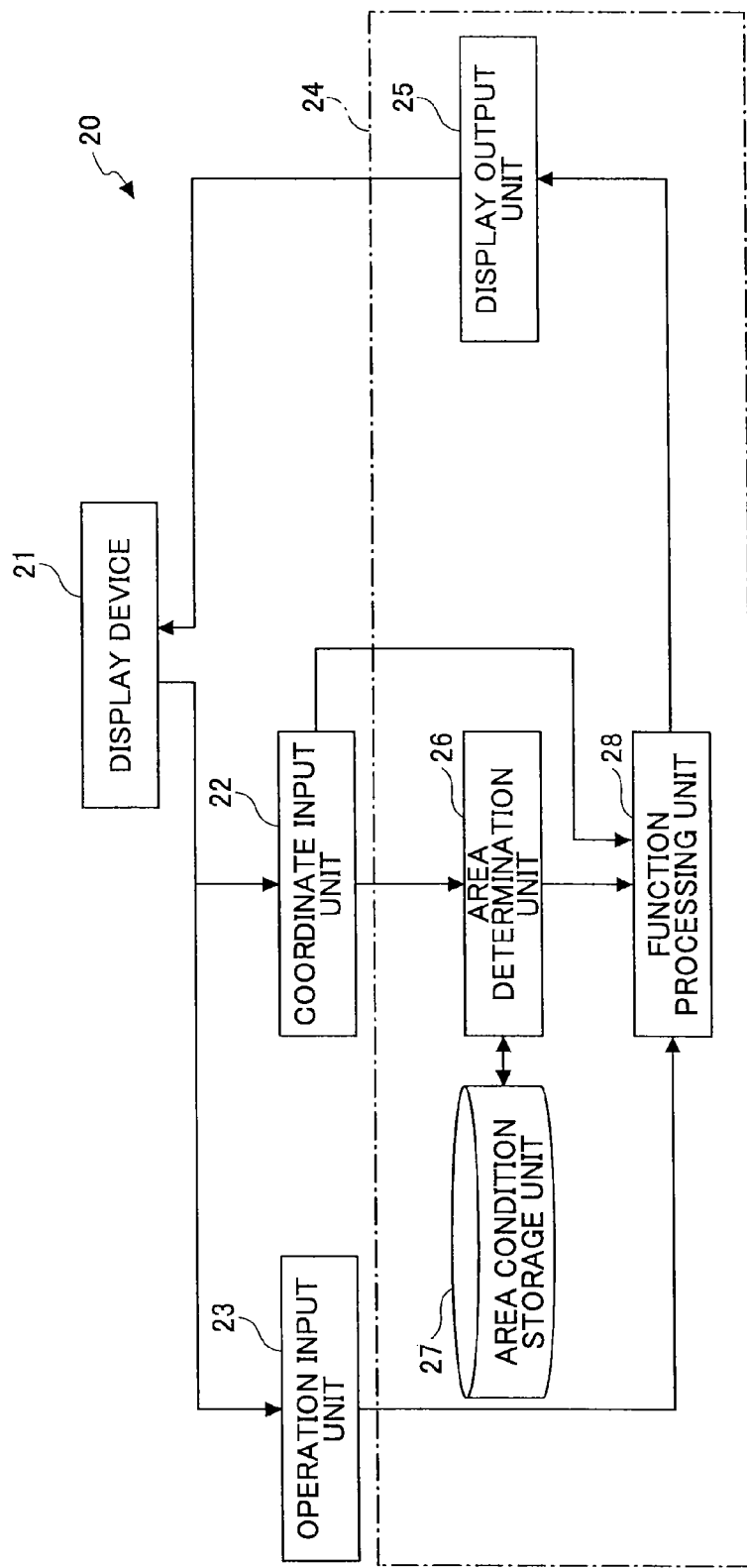
FIG. 2 is a functional block diagram of the information processing device according to the first embodiment of the present invention.

FIG. 2 is a functional block diagram of the information processing device 20 according to the first embodiment of the present invention. As shown in FIG. 2, the information processing device 20 includes the display device 21 provided with, for example, a liquid crystal display unit (not shown) for displaying images and a touch panel (not shown), an operation input unit 23 and a coordinate input unit 22 that are examples of an input operation function identification unit, and a layout management unit 24.

The display device 21 includes the operation input unit 23 for detecting an operation input to the touch panel, and the coordinate input unit 22 for detecting the position of the input operation. For example, the input operation is performed by a "touch operation" or a "drag operation" on the touch panel. The "touch operation" means that the finger touches a position of one point (a position expressed by one pair of coordinates) on the touch panel, and a "drag operation" means to run the finger on the touch panel along a necessary length (along positions expressed by plural pairs of coordinates). Instead of the operation input by a finger tip on the touch panel, the click operation or the drag operation may be performed by operating a cursor or a pointer with a mouse or a keyboard.

The layout management unit 24 is for managing the input operations to manage the arrangement (layout) of strokes such as lines, characters, and figures drawn in areas 11, 12, 16, 17, and 18 in the screen of the display device 21. The layout management unit 24 includes a function processing unit 28 for executing a function in a predetermined area, an area determination unit 26 for determining the area in which the function is to be executed, an area condition storage unit 27 for storing conditions for making the determination, and a display output unit 25 for displaying, on the display device 21, the result of the function executed by the function processing unit 28. For example, if the function is for drawing a stroke, the execution result of the function is the drawn stroke, and if the function is page switching, the execution result of the function is the stroke in the new page after switching the page. The management of the layout includes drawing, moving, and deleting a stroke. The area determination unit 26 and the area condition storage unit 27 are examples of an area determination unit.

Although not shown, the function processing unit 28 includes a CPU (Central Processing Unit), a ROM (Read-Only Memory) for storing fixed data, a RAM (Random Access Memory) for temporarily storing data, a backup memory constituted by a rewritable non-volatile memory, an input interface circuit including an A/D converter and a buffer, and an output interface circuit including a driving circuit.

The coordinate input unit 22 is connected to the area determination unit 26 and the function processing unit 28, and the area determination unit 26 is connected to the area condition storage unit 27. The coordinates are set according to positions on the display screen.

The area condition storage unit 27 stores conditions for determining the area, among the first area 16 through the third area 18 on the display screen shown in FIG. 1B, to which the position of operation input (position on an XY coordinate system) on a touch panel (i.e., the display screen) belongs (the position is the position detected by the coordinate input unit 22 when a user performs operation input on the touch panel). The area determination unit 26 determines the area to which the position of the operation input belongs, based on conditions stored in the area condition storage unit 27, as described in detail below.

FIG. 5A shows an example of conditions stored in the area condition storage unit 27 of the information processing device 20 according to the first embodiment of the present invention. This example is applicable to a case where a screen is divided into two areas 11 and 12, as shown in FIG. 1A. In FIG. 5A, in each line, conditions relevant to an X coordinate and a Y coordinate are stored, for determining the area to which the position of input operation belongs. In the second line, the second area 12 is assigned, and for the second area 12, "X<100 OR Y<100" is stored as the condition. In the first line, the first area 11 is assigned, but no conditions are stored for the first area 11. This is because any position that does not belong to the second area belongs to the first area, and therefore it is only necessary to determine whether the position belongs to the second area.

FIG. 5B shows another example of conditions stored in the area condition storage unit 27 of the information processing device 20 according to the first embodiment of the present invention. This example is applicable to a case where a screen is divided into three areas 16, 17, and 18, as shown in FIG. 1B. In FIG. 5B, each line stores conditions relevant to an X coordinate and a Y coordinate for determining the area to which the position of the input operation belongs. In the second line and the third line, the second area 17 and the third area 18 are assigned, respectively. For the second area 17, "X<100" is stored as the condition, and for the third area 18, "X>=100 AND Y<100" is stored as the condition. Although the first area 16 is assigned to the first line, due to the reasons described above, no conditions are stored for the first area 11.

Referring back to FIG. 2, the function processing unit 28 executes a function in an area identified by the determination of the area determination unit 26, based on the determination of the area determination unit 26 and in response to the contents of the function selected by the user detected by the operation input unit 23 (for example, "activate", "delete", "move", etc.). Furthermore, in the function processing unit 28, a signal indicating the values of the coordinates expressing the position where the user performed operation input, is input from the coordinate input unit 22.

Note that the determination as to which function has been selected by the user, may be made based on the detection of the operation input unit 23. Alternatively, for example, the function may be determined according to whether the operation input of the user has been performed in a range of coordinates expressing the position of the icon of "clear" for performing delete, based on coordinate values from the coordinate input unit 22. Furthermore, the function processing unit 28 includes a storage unit (not shown), which stores, for example, the page number of the page including the drawn characters, etc., and the coordinates of points constituting the characters, etc. The function processing unit 28 and the storage unit of the function processing unit 28 are an example of a function process unit.

The display output unit 25 is connected to the function processing unit 28, and displays the results of functions executed by the function processing unit 28 on the display device 21. For example, when the function is to draw, the drawn lines are displayed on the display device 21.

The operation of the function processing unit 28 of the information processing device 20 is controlled by the CPU of the function processing unit 28 or a separate processing device (not shown).

The information processing program according to an embodiment of the present invention causes a computer to execute an input operation function identifying step of identifying the input operation and function performed in the display screens 10, 15 including at least two areas 11, 12, an area determining step S11 of determining the area of the display screen to which the input operation belongs, a function processing step S12 of executing the process of the function corresponding to the input operation with respect to the area determined at the area determining step S11, and a display output step S13 of displaying, on the display screens 10, 15, the results of the process executed at the function processing step S12.

Figure 3:
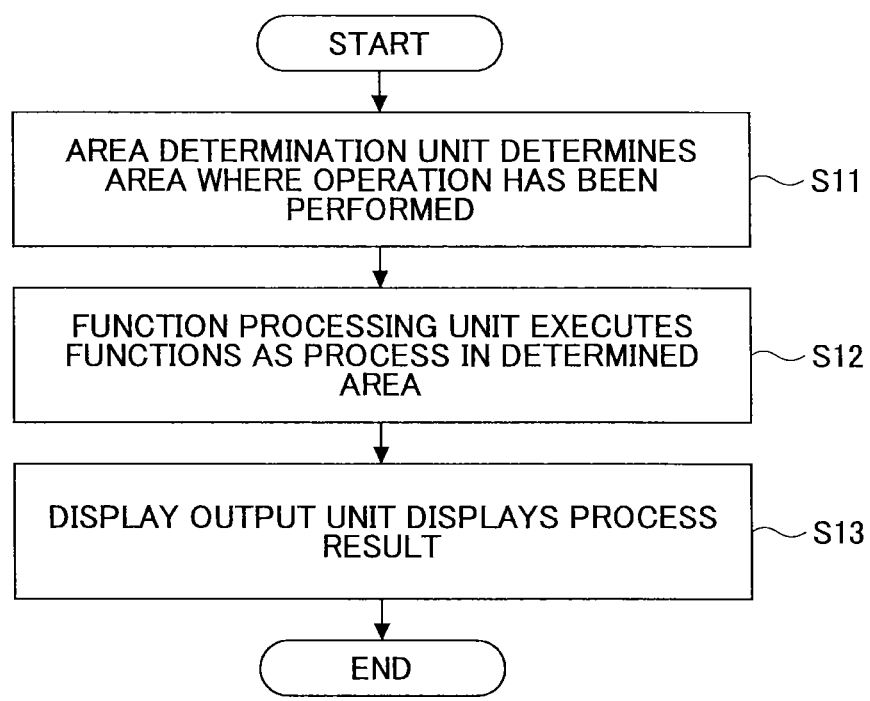
FIG. 3 is a flowchart of an example of a process performed by the information processing device according to the first embodiment of the present invention.

Operation Example of Information Processing Device According to First Embodiment FIG. 3 is a flowchart of an example of a process performed by the layout management unit 24 of the information processing device 20 according to the first embodiment of the present invention. When the user performs a touch operation or a drag operation on the touch panel, the coordinate input unit 22 sends, to the area determination unit 26 and the function processing unit 28 of the layout management unit 24, the values of coordinates on the display screen corresponding to the positions, which is an example of information relevant to the position at which the touch operation or the drag operation is performed. The operation input unit 23 sends a signal expressing a function selected by the user to the function processing unit 28.

When the signals expressing the values of the coordinates expressing the position at which the touch operation or the drag operation has been performed are received from the coordinate input unit 22, the area determination unit 26 determines the area in which the touch operation or the drag operation has been performed, based on the values of the coordinates (step S11). In this case, as described above, when the operation is a "touch operation", there is one pair of coordinates, and when the operation is a "drag operation", there are a plurality of pairs of coordinates corresponding to the positions relevant to the operation. When the position information is constituted by a plurality of pairs of coordinates, as described in detail below, when all of the points belong to the first area 16, the area determination unit 26 determines that the pairs of coordinates belong to the first area 16, and in other cases, for example, as in the screen shown in FIG. 1B, when the character string 19 of ABC also belongs to the second area 17 and the third area 18 other than the first area 16, the area determination unit 26 determines that the pairs of coordinates belong to the second area 17.

Next, when a signal expressing the operation performed by the user is received from the operation input unit 23 and a signal expressing the position information at which the operation input has been performed is received from the coordinate input unit 22, the function processing unit 28 executes a function based on the operation performed by the user in the area determined by the area determination unit 26 (step S12). Next, the function processing unit 28 causes the display output unit 25 to display the result of the process on the display device 21 (step S13). For example, when the user performs a drag operation in a drawing mode, on the screen of the display device 21, a line is drawn so as to connect the pairs of coordinates. When the user performs a touch operation, and the coordinates of the position at which the touch operation has been performed is included in the range of the icon of clear 11c, 12c (FIG. 1A), all of the drawings in the area determined by the area determination unit 26 are deleted, and the result is displayed on the display device 21.

According to the above viewpoints, the information processing method according to an embodiment of the present invention includes an input operation function identifying step of identifying the input operation and function performed in the display screens 10, 15 including at least two areas 11, 12, an area determining step S11 of determining the area of the display screen to which the input operation belongs, a function processing step S12 of executing the process of the function corresponding to the input operation with respect to the area determined at the area determining step S11, and a display output step S13 of displaying, on the display screens 10, 15, the results of the process executed at the function processing step S12.

Figure 4:
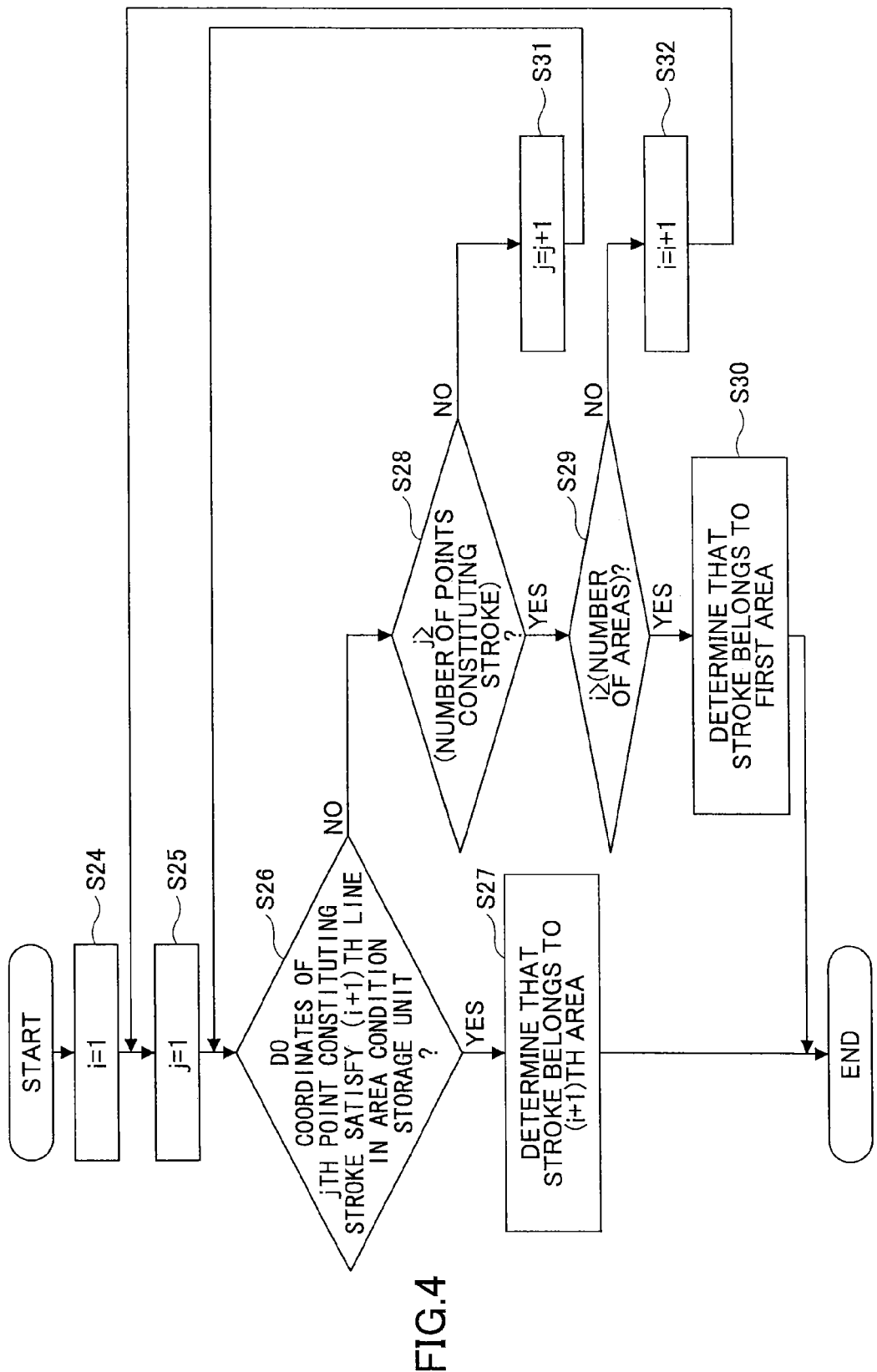
FIG. 4 is a flowchart of an example of a process performed by an area determination unit of the information processing device according to the first embodiment of the present invention.

FIG. 4 is a flowchart of an example of a process performed by the area determination unit 26 of the information processing device 20 according to the first embodiment of the present invention. When a user performs operation input, the input object expressed by a single coordinate or, for example, a plurality of pairs of coordinates like the character string 19 ABC in the screen shown in FIG. 1B, is referred to as a stroke.

In FIG. 4, "i" expresses the number of the area, and "j" expresses the number of the point corresponding to the position of the coordinates constituting a stroke. That is to say, in FIG. 1B, i is 1 for the first area 16, i is 2 for the second area 17, and i is 3 for the third area 18. Furthermore, for example, the position corresponding to coordinates of a point on the far left side among the coordinates of points constituting A in the character string 19 of ABC is set as j=1, the position corresponding to the coordinates of the adjacent point is set as j=2, and similarly, numbers are sequentially assigned to points constituting each character for all of the characters.

When the user performs operation input on the touch panel and draws a character including one stroke, as described above, the coordinate input unit 22 inputs, in the area determination unit 26, coordinates corresponding to information relevant to positions of all points constituting the one stroke. The area determination unit 26 assigns 1 in "i" (step S24), and assigns 1 in "j" (step S25). Next, the area determination unit 26 determines whether the coordinates of the jth point constituting the one stroke satisfies the conditions stored in the (i+1)th line in the area condition storage unit 27 (step S26). When the result of the determination at step S26 is YES, the process proceeds to step S27, and the stroke is determined to belong to the (i+1)th area, and the process ends.

When the determination at step S26 is NO, the area determination unit 26 determines whether the number of points constituting the stroke is less than or equal to "j" (step S28). When the result of step S28 is YES, the process proceeds to the next step, and the area determination unit 26 determines whether the number of areas is less than or equal to "i" (step S29). When the result of step S29 is YES, the process proceeds to step S30, and the area determination unit 26 determines that the stroke belongs to the first area 16 and the process ends.

When the result of determination at step S28 is NO, j+1 is assigned in j (step S31), and the process returns to step S26. When the result of determination at step S29 is NO, i+1 is assigned to i (step S32), and the process returns to step S25.

Next, a description is given of how the area determination unit 26 specifically performs the process based on the flowchart of FIG. 4. In this example, the screen is divided into the first area 11 and the second area 12, as shown in FIG. 1A. In this example, the conditions shown in FIG. 5A are stored in the area condition storage unit 27. When a stroke is drawn in the display device 21 of the information processing device 20, it is assumed that the coordinates (j=1) of the first point of the stroke belongs to the first area 11, and the coordinates (X1, Y1) of the second point of the stroke belongs to the second area 12. In this example, there are two areas, i.e., the first area 11 and the second area 12, and therefore it is assumed that in the area condition storage unit 27, the condition of "X<100 OR Y<100" is stored for the second area 12 in the second line.

After steps S24 and S25, in step S26, it is determined whether the coordinates of the (j=1)th point of the stroke satisfies the condition of the second area 12 in the second line "X<100 OR Y<100". The coordinates of the (j=1)th point of the stroke belong to the first area 11, and therefore the condition of the second area 12 "X<100 OR Y<100" is not satisfied, and the determination in this step is NO. Accordingly, the process proceeds to step S28. In step S28, in this example, there are coordinates of the second point, and the number of points constituting the stroke is larger than (j=1), and therefore the determination in this step is NO, and the process proceeds to step S31. In step S31, j+1 is assigned to j, and the process proceeds to step S26. In step S26, the coordinates of the (j=2)th point constituting the stroke satisfies the (i+1=2)th line in the conditions stored in the area condition storage unit 27, and therefore the determination is YES, and the process proceeds to step S27. In step S27, it is determined that the stroke belongs to the second area 12, and the process ends.

A storage unit such as a stroke storage unit 76 in an information processing device 70 (FIG. 7) according to a second embodiment of the present invention described below may be provided in the function processing unit 28 of the information processing device 20 shown in FIG. 2, and the information relevant to the stroke as determined as above may be stored in such a storage unit. The information relevant to the stroke may include the relationship between a stroke ID, an area ID, a page ID, and coordinates of points constituting the stroke, as shown in FIG. 10.

Second Embodiment

Example of Configuration of Screen

Figure 6A:
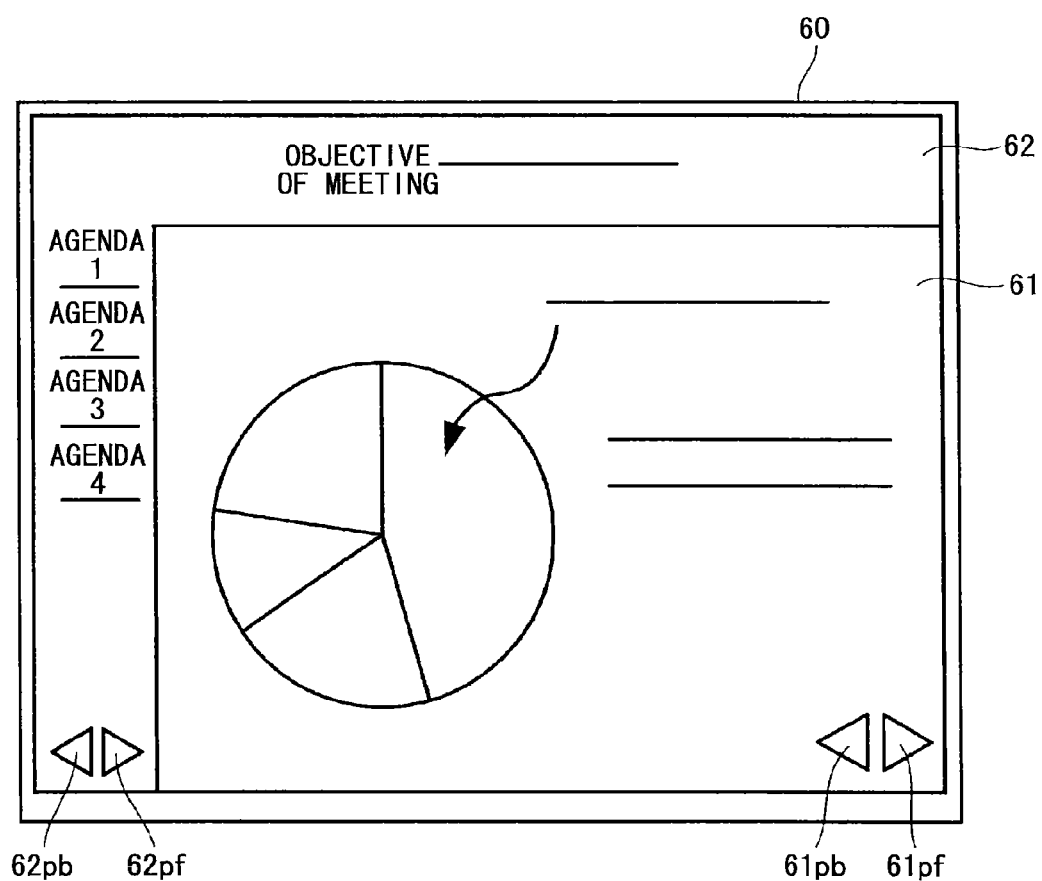
FIG. 6A illustrates an example of a screen displayed on a display device of an information processing device according to a second embodiment of the present invention.

FIG. 6A illustrates an example of a screen displayed on the display device 21 of the information processing device 70 (FIG. 7) according to a second embodiment of the present invention. As described below in detail, the information processing device 70 (FIG. 7) according to the present embodiment is different from the information processing device 20 according to the second embodiment described with reference to FIGS. 1A, 1B, and 2, in that the page can be switched in each area obtained by dividing a screen.

Specifically, as shown in FIG. 6A, a display screen 60 includes a wide first area 61 on the bottom side for drawing contents relevant to the agenda being discussed in the meeting, and a narrow second area 62 occupying the left side and the top side for listing the agenda items of the meeting and for indicating the objective of the meeting. At the bottom of both areas, there are triangular buttons 61pf, 61pb, 62pf, and 62pb provided for switching the page. The buttons 61pf and 62pf are for proceeding from the page presently displayed to the next page (i.e., from the present display screen to the next display screen), and the buttons 61pb and 62pb are for returning from the page presently displayed to the previous page. For example, when the button 61pf is pressed, the page of the first area 61 is switched to the next page, and when the button 62*pb* is pressed, the page of the second area 62 returns to the previous page. In the other area where the button is not pressed, the page remains unchanged.

Figure 6B:
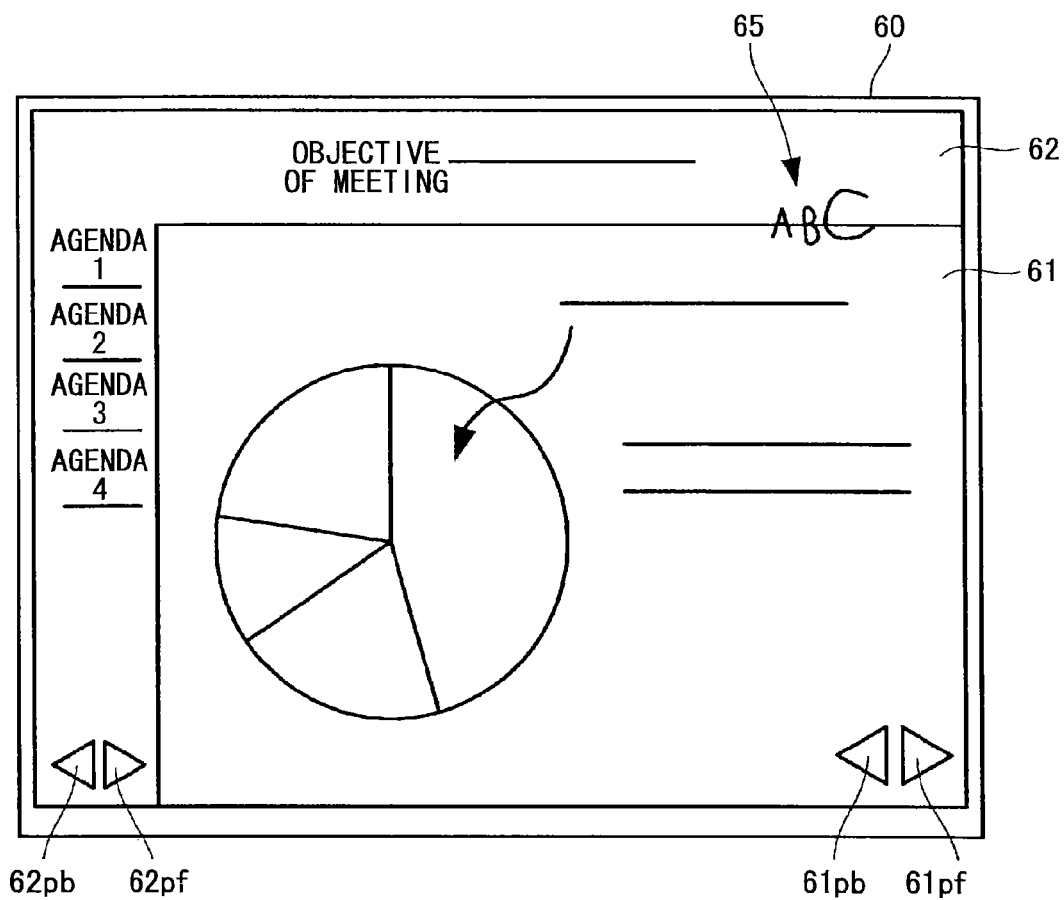
FIG. 6B illustrates another example of a screen displayed on a display device of an information processing device according to the second embodiment of the present invention.

FIG. 6B shows a state where a character string 65 of ABC is written in the display screen 60 shown in FIG. 6A. As shown in FIG. 6B, the character string 65 of ABC is written across the first area 61 and the second area 62. The pairs of coordinates of the character string 65 of ABC are determined as belonging to the second area 62, according to the flowchart in FIG. 4.

Example of Information Processing Device 70

Figure 7:
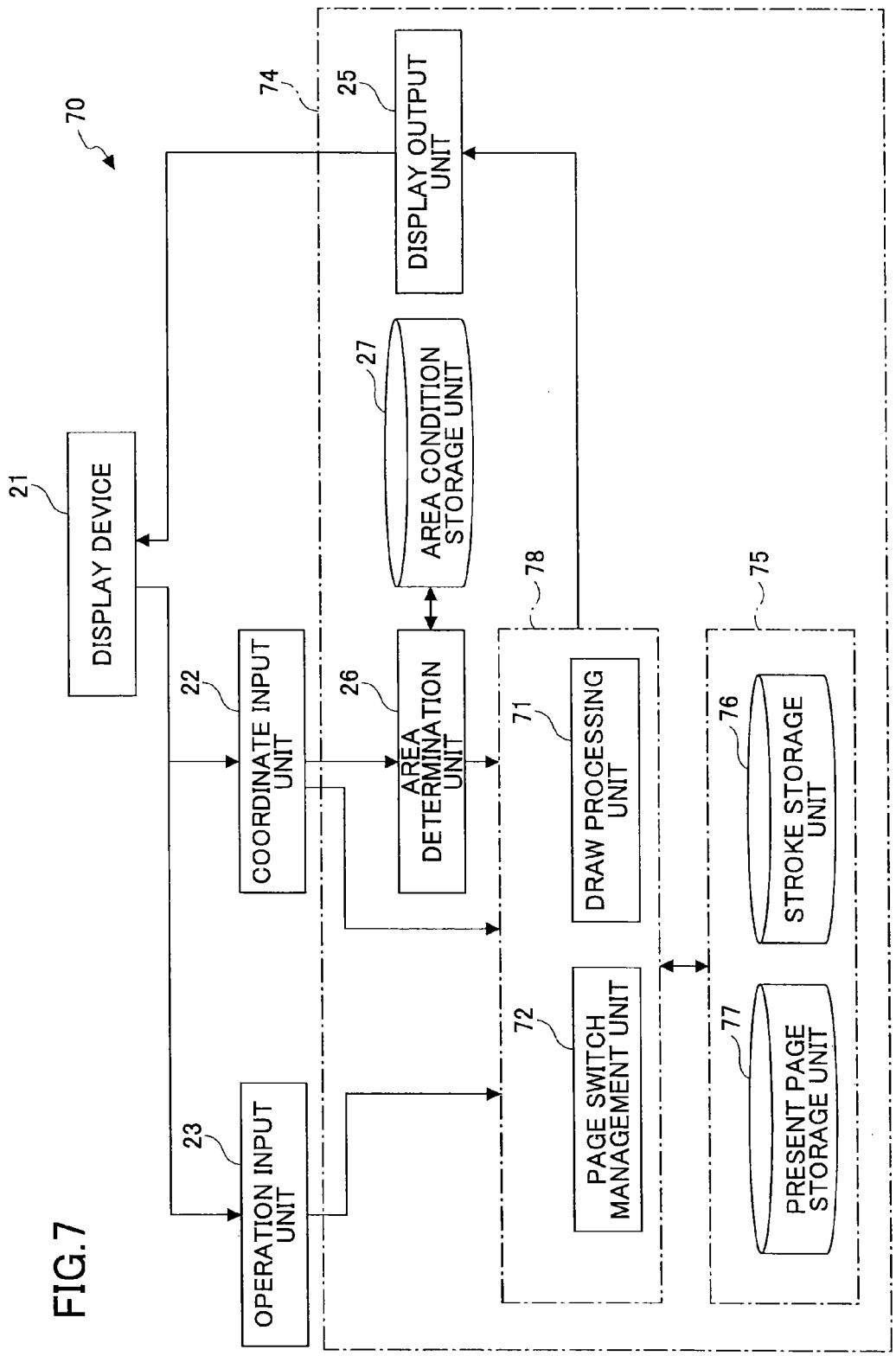
FIG. 7 is a functional block diagram of an information processing device according to the second embodiment of the present invention.

FIG. 7 is a functional block diagram of the information processing device 70 according to the second embodiment of the present invention. The information processing device 70 according to the second embodiment is different from the information processing device 20 according to the first embodiment shown in FIG. 2, in that the configurations of a function processing unit 78 and a storage unit 75 of a layout management unit 74 in the information processing device 70 according to the present embodiment are different from the function processing unit 28 of the information processing device 20 according to the first embodiment.

The storage unit 75 includes a present page storage unit 77 and the stroke storage unit 76. In FIG. 7, the storage unit 75 is illustrated to include only the present page storage unit 77 and the stroke storage unit 76; however, the storage unit 75 also includes a data storage unit for storing other data necessary for executing functions other than switching pages and drawing. However, such a storage unit is not shown as a matter of simplifying the configuration of the present embodiment and facilitating understanding.

The present page storage unit 77 stores information relevant to the page number presently being displayed, for each of the plurality of areas included in the screen of the display device 21.

Figures 8, 9:
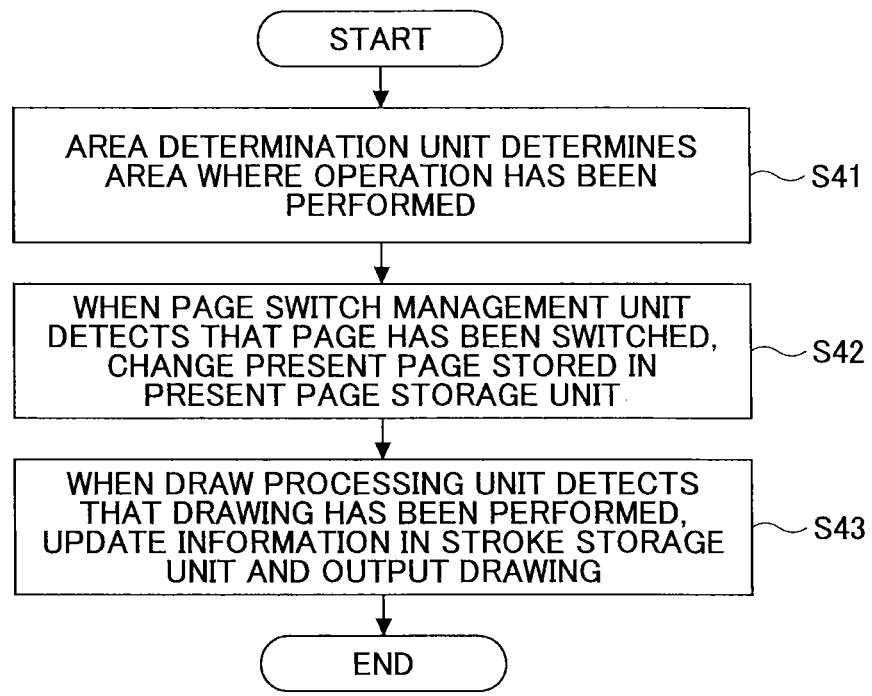
FIG. 8 is a flowchart of an example of a process performed by the information processing device according to the second embodiment of the present invention.
FIG. 9 shows the relationship between the area number and the present page number stored in a present page storage unit of the information processing device according to the second embodiment of the present invention.

FIG. 9 shows the relationship between the area number and the present page number stored in the present page storage unit 77. In this example, in the present screen displayed on the display device 21, the page number of the first area 61 is 1 and the page number of the second area 62 is 3. In FIG. 9, the line " . . . " under the line of the second area 62 is used when there is a third area, and " . . . " merely expresses abbreviation. When there is a fourth area, etc., similarly, lines are sequentially added below the line of the third area.

The stroke storage unit 76 stores information relevant to all strokes included in each page of each area.

FIG. 10 shows an example of information relevant to strokes stored in the stroke storage unit 76. This stored information is relevant to all strokes included in each page of each area. As shown in FIG. 10, information relevant to strokes includes, for example, a stroke ID in the first row, an area ID in the second row, a page ID in the third row, and point coordinates in the fourth row.

The stroke ID in the first row is constituted by a number for identifying a stroke. For example, as shown in FIG. 10, the strokes may be numbered in the order they are drawn. The area ID in the second row is constituted by a number indicating the area to which the stroke belongs. For example, an area ID "1" means the first area 61 (FIG. 6A), and the area ID "2" means the second area 62 (FIG. 6A). The page ID in the third row is constituted by a number indicating the page number of the area identified by the area ID to which the stroke belongs. For example, a page ID "2" means that a stroke having a stroke ID of 4 is present on the second page of the first area 61. The point coordinates in the fourth row indicate XY coordinates in an orthogonal coordinate system of all points constituting each stroke. As long as the positions of the points of the stroke can be identified, a polar coordinate system may be used instead of the orthogonal coordinate system. Note that " . . . " in FIG. 10 expresses abbreviation.

The function processing unit 78 includes a draw processing unit 71 and a page switch management unit 72. The function processing unit 78 is illustrated to include only the draw processing unit 71 and the page switch management unit 72; however, the function processing unit 78 also includes managing and processing units necessary for executing functions other than switching pages and drawing. However, such managing and processing units are not shown as a matter of simplifying the configuration of the present embodiment and facilitating understanding.

When the user performs operation input for switching the page in an area on the display screen of the display device 21, the page switch management unit 72 detects that the page has been switched in the area determined by the area determination unit 26. In this case, the area determination unit 26 determines the area based on the position information input from the coordinate input unit 22, and detects that the page has been switched based on information input from the operation input unit 23 and the coordinate input unit 22. When it is detected that the page has been switched, the page switch management unit 72 updates the drawn image on the screen displayed on the display device 21 according to output of the display output unit 25 and information of the present page number stored in the present page storage unit 77, to the drawn image and the information of the page number relevant to the new page, respectively.

When the user performs an input operation for drawing in an area in the display device 21, the draw processing unit 71 detects that a drawing operation has been performed in the area determined by the area determination unit 26. In this case, the determination of the area by the area determination unit 26 is made based on position information input from the coordinate input unit 22, and the detection of the drawing operation is performed based on information input from the operation input unit 23 and the coordinate input unit 22. When the drawing operation is detected, the draw processing unit 71 refers to the present page number in the area stored in the present page storage unit 77, updates the stroke storage unit 76 to add a line for a new stroke ID, and stores information of the area ID, the page ID, and point coordinates relevant to the new stroke. Furthermore, the draw processing unit 71 updates the drawn image displayed on the display device 21 according to output from the display output unit 25, based on the updated information. That is to say, the new stroke is drawn in a predetermined position in a predetermined area.

Operation Example of Information Processing Device According to Second Embodiment FIG. 8 is a flowchart of an example of a process performed by the layout management unit 74 of the information processing device 70 according to the second embodiment of the present invention. When the user performs a touch operation or a drag operation on the touch panel, the coordinate input unit 22 sends, to the area determination unit 26 and the function processing unit 78 of the layout management unit 74, the values of coordinates corresponding to the positions, which is an example of information relevant to the position at which the touch operation or the drag operation is performed. The operation input unit 23 sends a signal expressing a function selected by the user to the function processing unit 78.

When the signals expressing the values of the coordinates expressing the position at which the touch operation or the drag operation has been performed are received from the coordinate input unit 22, the area determination unit 26 determines the area in which the touch operation or the drag operation has been performed, based on the values of the coordinates (step S41). In this case, as described above, when the operation is a "touch operation", there is one pair of coordinates, and when the operation is a "drag operation", there are a plurality of pairs of coordinates corresponding to the positions relevant to the operation.

Next, the page switch management unit 72 of the function processing unit 78 receives a signal expressing the operation performed by the user from the operation input unit 23 and a signal expressing the position information at which the operation input has been performed from the coordinate input unit 22. Accordingly, the page switch management unit 72 detects that an operation of switching pages has been performed in the area determined by the area determination unit 26, and updates the present page number stored in the present page storage unit 77 to the new page number (step S42).

At this time, when the draw processing unit 71 detects that the drawing has been performed, the process proceeds from step S42 to the next step S43. In step S43, the draw processing unit 71 updates the information of the stroke storage unit 76, and causes the display output unit 25 to draw the new stroke on the new page based on the updated information.

Step S42 is described in more detail. The page switch management unit 72 determines which one of the buttons 61pf, 61pb for switching pages have been pressed, in the area identified at step S41, according to position information expressing where operation input has been performed sent from the coordinate input unit 22. Next, the page switch management unit 72 acquires, from the present page storage unit 77, the present page number in the area identified at step S41. At this time, for example, when the page switch management unit 72 determines that the button 61pf for switching to the next page has been pressed, the present page number stored in the present page storage unit 77 is replaced with a new page number. Meanwhile, when the present page number is 1, and the page switch management unit 72 determines that the button 61pb for returning to the previous page has been pressed, no processes are executed and the process ends.

According to the example of the page number stored in the present page storage unit 77 shown in FIG. 9, in step S42, for example, when the button 61pb for switching pages to return to the previous page is pressed in the second area 62, the page switch management unit 72 acquires the present page number "3" of the second area 62 stored in the present page storage unit 77, and rewrites the page number to the previous page number "2".

Furthermore, when the page has been switched to the page on which a stroke is drawn, the page switch management unit 72 refers to the stroke storage unit 76 and acquires all the information relevant to the stroke present in the destination page of the page switching in the area identified by the area determination unit 26. Next, upon performing the operation of page switching, the page switch management unit 72 updates the present page number stored in the present page storage unit 77 to the page number of the destination page, accesses the storage unit (not shown) in which the page information is stored, and reads the information of the page corresponding to the new page number. This information of the new page is displayed on the display device 21 of the display output unit 25. At this time, the page switch management unit 72 causes the display output unit 25 to draw the stroke acquired from the stroke storage unit 76 on an image of the new page of the display device 21.

In step S43, when the draw processing unit 71 detects that a new object has been drawn, the process proceeds as follows. When the coordinate input unit 22 and the operation input unit 23 detects that the user has performed a drag operation on the display device 21, the area determination unit 26 identifies the area in which the drag operation is performed, based on the information of the coordinate input unit 22. For example, assuming that the drag operation has been performed in the first area 61, the draw processing unit 71 detects that an object has been drawn, and acquires the present page number of the first area 61 from the present page storage unit 77.

Next, the draw processing unit 71 acquires, from the coordinate input unit 22, information expressing the pair of coordinates corresponding to the position of the point of the object drawn according to the drag operation by the user, and causes the display output unit 25 to draw the object at the position corresponding to the coordinates on the display device 21. Furthermore, the draw processing unit 71 adds a line for new data below the last line of data shown in, for example, FIG. 10, which is stored in the stroke storage unit 76, stores, for example, a number "8" as the stroke ID in the first row, stores "1" in the area ID of the second row, stores, for example, "2" as the page ID in the third row, and stores the pairs of coordinates obtained from the coordinate input unit 22 as the point coordinates in the fourth row.

According to the present embodiment, the page can be switched in each area. Furthermore, the character string 65 "ABC" drawn across plural areas is handled as belonging to a specific area. Therefore, when the character string 65 "ABC" is determined to belong to the second area 62, even if the page is switched in the first area 61, it is possible to avoid a situation where part of or the entirety of the character string 65 drawn in the first area 61 disappears upon switching the page in the first area 61, so that the character string 65 remains unaffected in the original position on the screen.

Third Embodiment

Example of Configuration of Screen

Figure 11A:
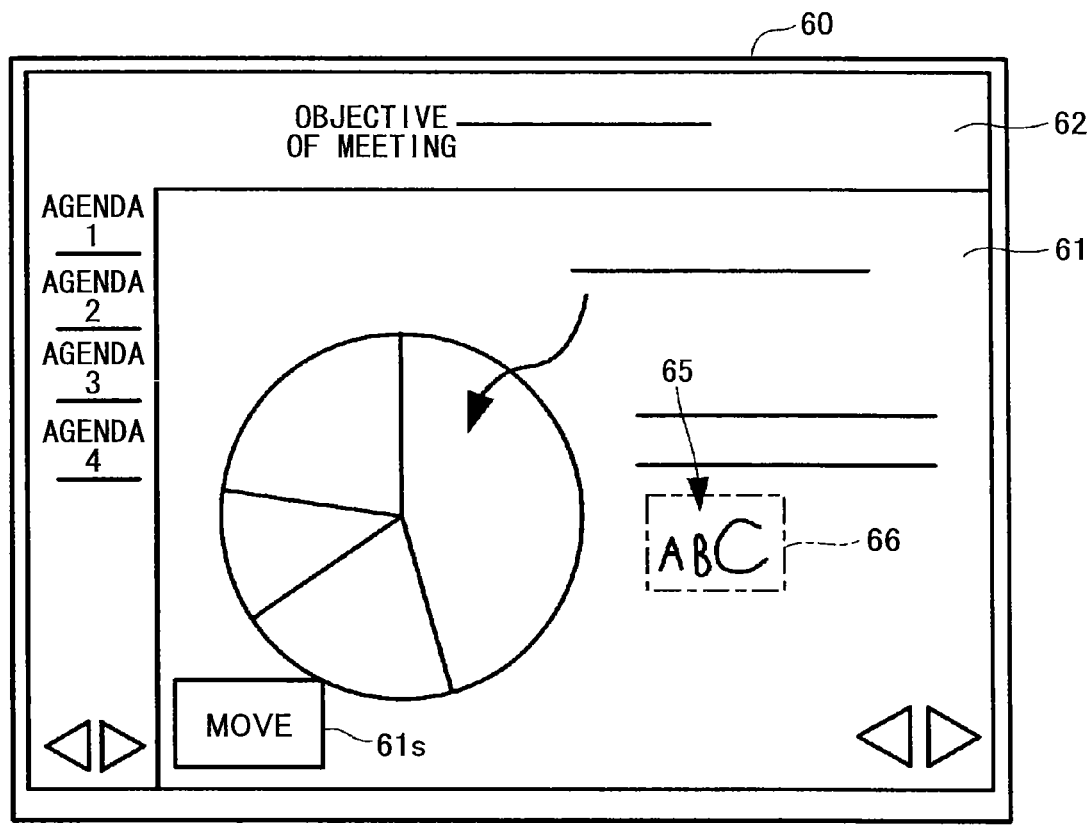
FIGS. 11A through 11C are for describing an example of moving a stroke in a screen displayed on a display device of an information processing device according to a third embodiment of the present invention.

FIG. 11A illustrates an example of a screen displayed on a display device 21 of an information processing device 80 (FIG. 12) according to a third embodiment of the present invention. As described below in detail, the information processing device 80 (FIG. 12) according to the present embodiment is different from the information processing device 70 according to the second embodiment in FIG. 7 in that the stroke can be moved across plural areas.

Figure 11B:
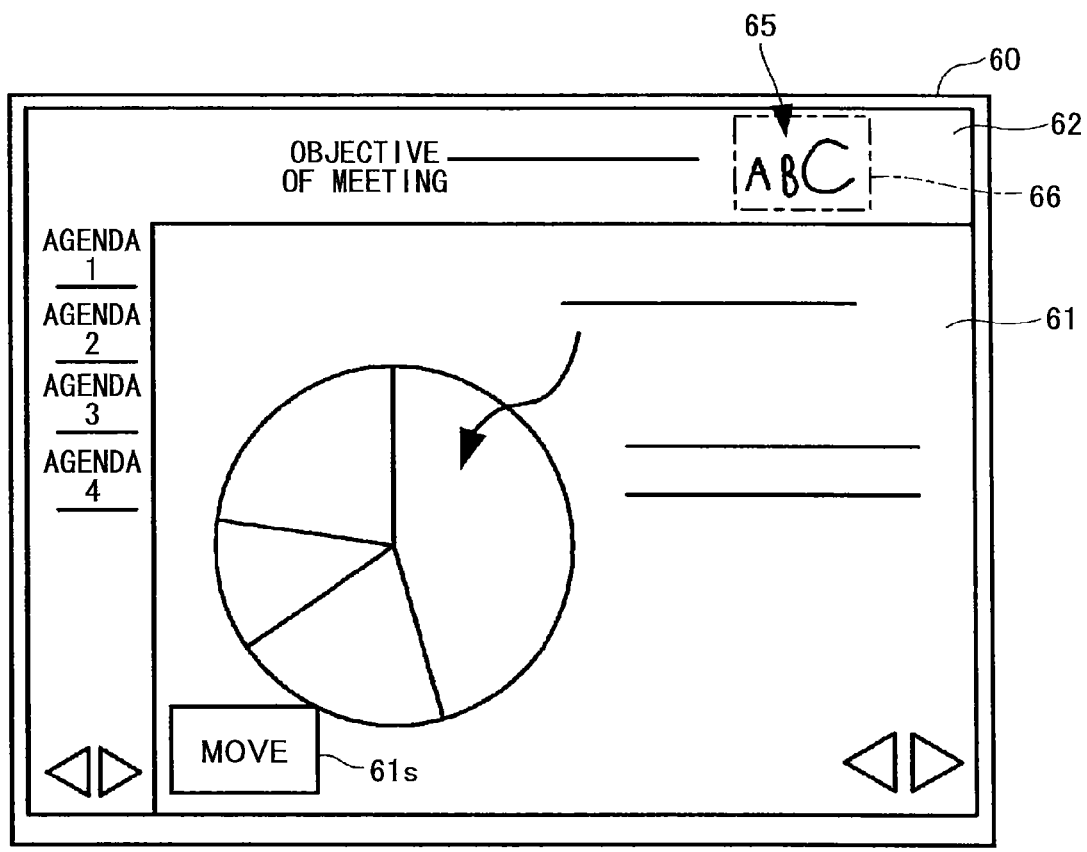
Figure 11C:
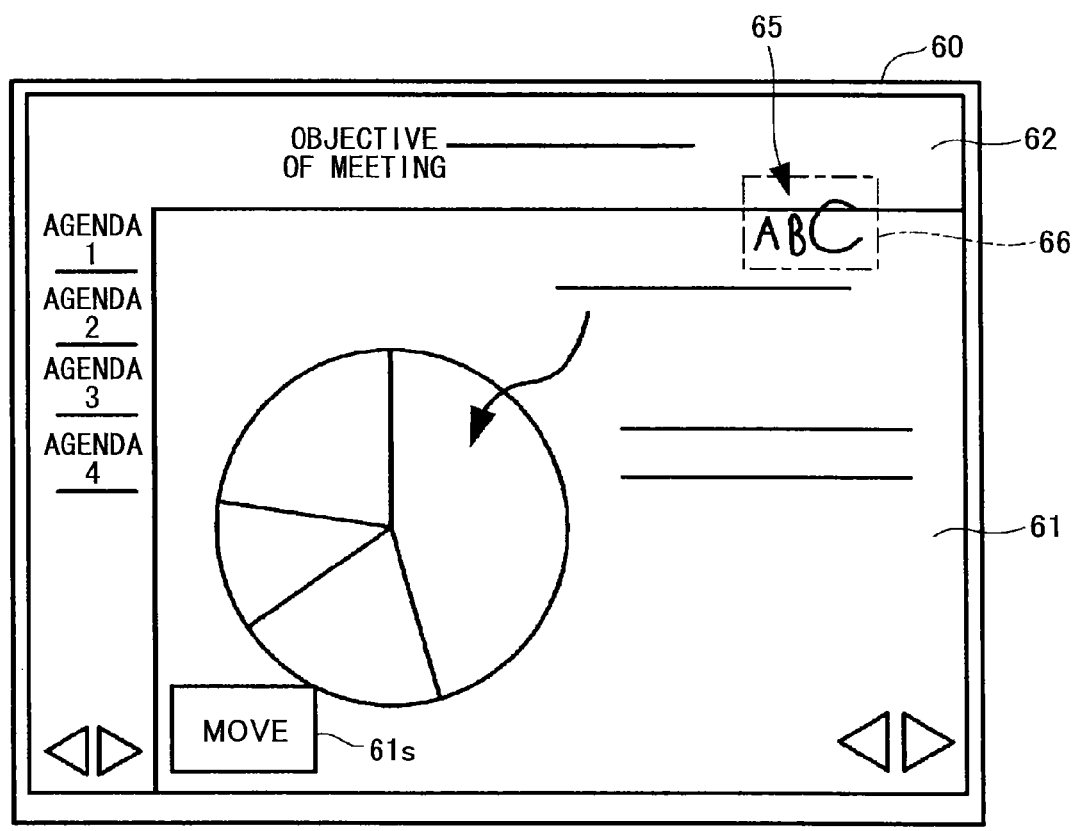

An overview of the display screen is described as follows. FIGS. 11A through 11C show the display screen 60, which has the same configuration as the display screen 60 shown in FIGS. 6A and 6B. The display screen 60 includes the first area 61 and the second area 62. However, at the bottom left of the first area 61, a button 61s is additionally provided, which is an icon displaying "move". The button 61s is used for starting and stopping the function of moving the stroke in the screen.

The information processing device 80 (FIG. 12) has two modes, i.e., a drawing mode and a draw change mode. Under regular circumstances, the drawing mode is used. In the drawing mode, when the user performs a drag operation for a certain length on the display screen 60 with his fingertip, a handwritten line can be drawn along the position where the drag operation has been performed. For example, FIG. 11A shows an example where the user has performed a drag operation to draw the character string 65 of ABC on the right side and slightly toward the bottom of the first area 61, in the drawing mode. However, at the time point when drawing is performed in the drawing mode, a rectangular box 66 drawn by dashed-dotted lines surrounding the character string 65 of ABC is not displayed, unlike the example shown in FIG. 11A.

Subsequently, when the user presses a move button 61s (performs a touch operation at the position of the button 61s), the information processing device 80 changes to the draw change mode. In the draw change mode, when at least one stroke is selected from among the strokes presently displayed in the screen, for example, when the character string 65 of ABC which is one of the strokes is selected, the character string 65 is displayed surrounded by the rectangular box 66 drawn by dashed-dotted lines as shown in FIG. 11A. Instead of displaying the box 66, the range of the box 66 may be displayed by a color other than the color of the character string 65. In other words, the selected character string 65 is activated. In this state, the user can drag the rectangular box 66 drawn by dashed-dotted lines to move the character string 65.

FIG. 11B shows a state where the rectangular box 66 drawn by dashed-dotted lines is dragged, so that the character string 65 of ABC is moved from the first area 61 to the second area 62. In this state, the character string 65 of ABC is still surrounded by the rectangular box 66 drawn by dashed-dotted lines, and the user can drag the rectangular box 66 drawn by dashed-dotted lines to further move the character string 65 of ABC. FIG. 11C shows a state where the character string 65 of ABC has moved to the boundary between the first area 61 and the second area 62. In other words, the character string 65 of ABC is present across the first area 61 and the second area 62. In FIG. 11C, the character string 65 is still surrounded by the rectangular box 66 drawn by dashed-dotted lines, and therefore the character string 65 can be further moved. At this time point, when the user presses the button 61s once again, the mode returns to the drawing mode from the draw change mode, the rectangular box 66 drawn by dashed-dotted lines disappears from the screen, and the character string 65 cannot be moved.

Example of Information Processing Device 80

Figure 12:
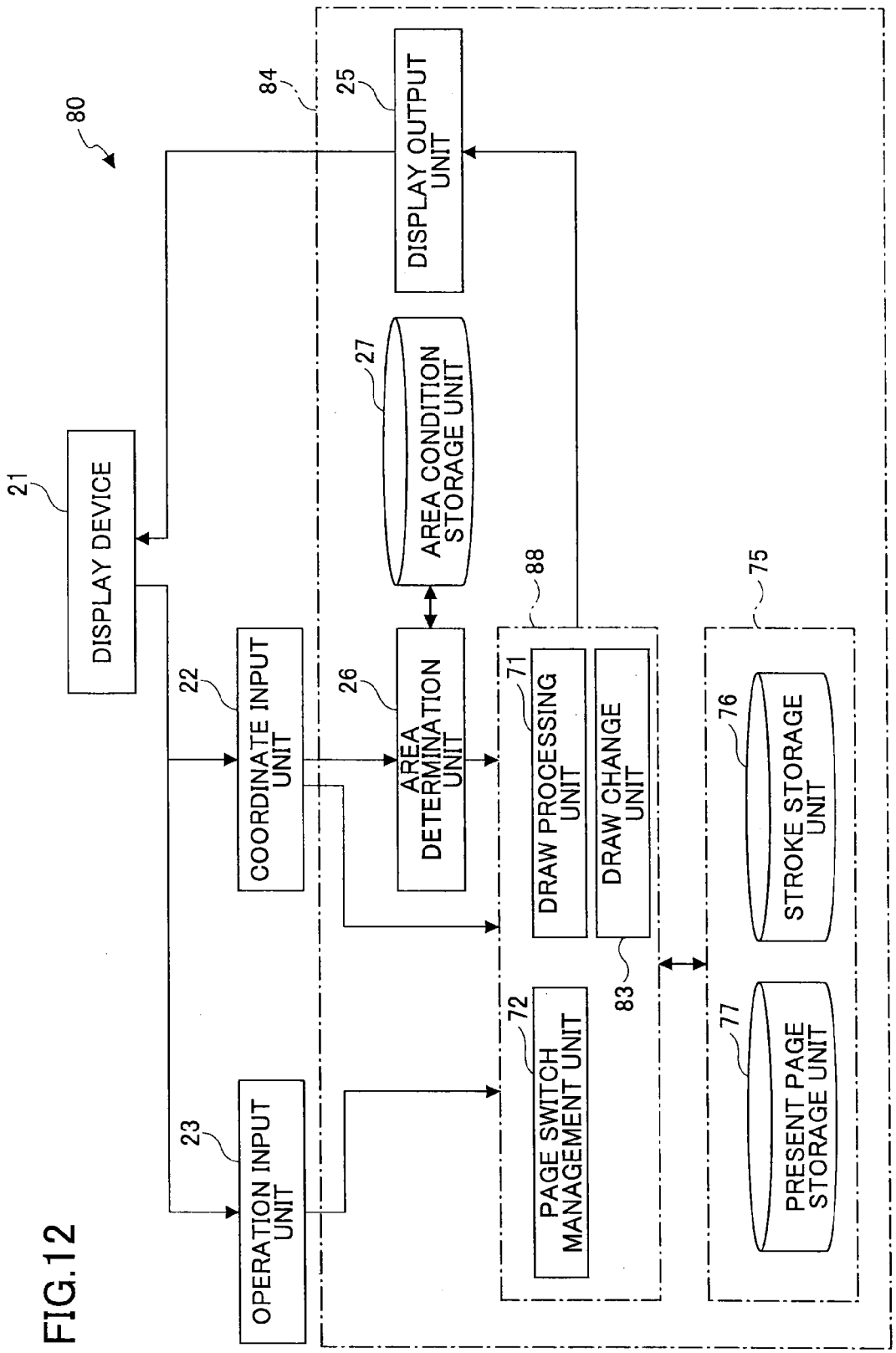
FIG. 12 is a functional block diagram of the information processing device according to the third embodiment of the present invention.

FIG. 12 is a functional block diagram of the information processing device 80 according to the third embodiment of the present invention. The information processing device 80 according to the third embodiment is different from the information processing device 70 according to the second embodiment shown in FIG. 7, in that in the information processing device 80, a function processing unit 88 of a layout management unit 84 further includes a draw change unit 83, and the draw processing unit 71 and the draw change unit 83 function in the drawing mode and the draw change mode, respectively. The mode is switched between the drawing mode and the draw change mode by, for example, pressing the "move" button 61s provided in the first area 61 of the display screen 60 shown in FIG. 11A, as described above. The "move" button 61s is an example of a mode change unit.

When the "move" button 61s is pressed, the draw change unit 83 detects that the mode has switched to the draw change mode from the drawing mode based on an input signal from the operation input unit 23 and the coordinate input unit 22. Next, when the user moves the stroke that has been activated, information expressing the contents of the movement is input to the draw change unit 83 from the operation input unit 23 and the coordinate input unit 22. When this information is input, the draw change unit 83 determines the contents of the change to be made with respect to the present drawing, based on signals of one of or a combination of the operation input unit 23, the coordinate input unit 22, and the area determination unit 26. Based on this determination, the draw change unit 83 updates the information stored in the stroke storage unit 76. Furthermore, based on the updated contents, the draw change unit 83 causes the display output unit 25 to update the display contents on the display device 21.

Figure 13:
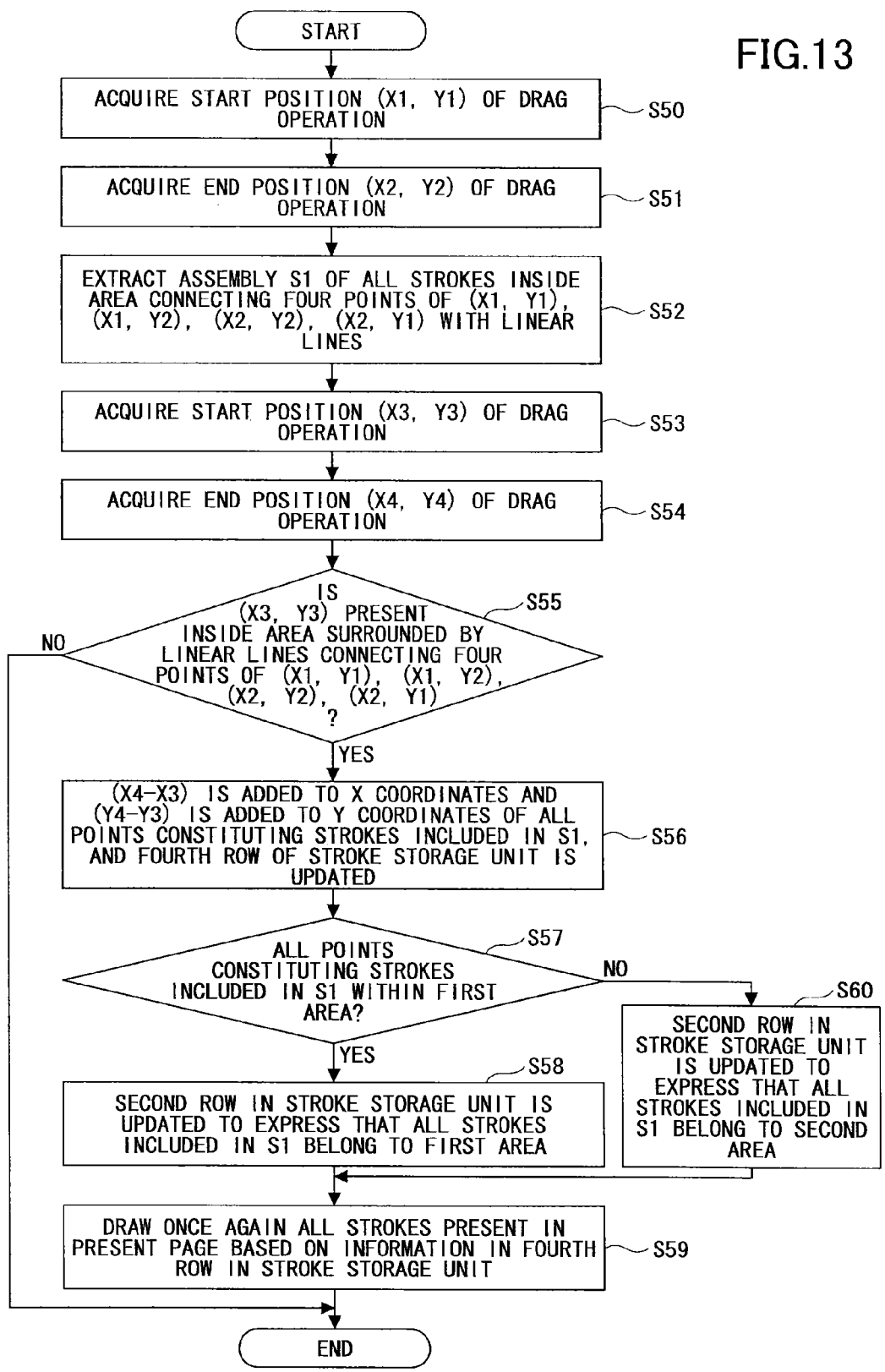
FIG. 13 is a flowchart of an example of a process performed by a draw change unit when moving a stroke in a screen displayed on the display device of the information processing device according to the third embodiment of the present invention.

Operation Example of Information Processing Device According to Third Embodiment FIG. 13 is a flowchart of an example of a process performed by the draw change unit 83 of the function processing unit 88 of the layout management unit 84 of the information processing device 80 according to the third embodiment of the present invention. At the start point of the flowchart, it is assumed that the draw change unit 83 has switched to the draw change mode.

When the user performs a drag operation on the touch panel, the draw change unit 83 acquires, from the coordinate input unit 22, coordinates (X1, Y1) corresponding to the start position of the drag operation (step S50), and acquires coordinates (X2, Y2) corresponding to the end position of the drag operation (step S51). At the same time, the draw change unit 83 acquires, from the area determination unit 26, information relevant to the area to which the identified coordinates belong, and acquires, from the present page storage unit 77, the present page number in each area. Next, the draw change unit 83 refers to all strokes in the present page in each area, among the stroke IDs stored in the stroke storage unit 76, and extracts an assembly S1 of all strokes whose coordinates of all points constituting the stroke (information in fourth row) are present inside a rectangular area formed by connecting the four points of (X1, Y1), (X1, Y2), (X2, Y2), (X2, Y1) with linear lines (step S52). Accordingly, the stroke to be moved is activated. When there are no strokes present in the rectangular area, the process returns to the start state.

At this time point, when the coordinate input unit 22 detects that the user has performed a further drag operation, the draw change unit 83 continues to perform the following operations. Note that when the operation input unit 23 detects that the user has performed an operation other than the drag operation, the process ends while remaining in the draw change mode.

When the draw change unit 83 acquires, from the coordinate input unit 22, that the drag operation has been performed from (X3, Y3) to (X4, Y4) (steps S53 and S54), the draw change unit 83 determines whether (X3, Y3) is present inside the rectangular area formed by connecting the four points of (X1, Y1), (X1, Y2), (X2, Y2), (X2, Y1) with linear lines (step S55). Accordingly, it is determined whether this drag operation is for moving the activated stroke.

When (X3, Y3) is not present in the rectangular area (NO in step S55), the process ends while remaining in the draw change mode. According to need, the drag operation of step S50 is performed again.

When (X3, Y3) is present in the rectangular area (YES in step S55), the process proceeds to the next step S56.

In step S56, (X4−X3) is added to the X coordinates of all points constituting all strokes included in the assembly S1, and (Y4−Y3) is added to the Y coordinates of all points constituting all strokes included in the assembly S1, and the data of the point coordinates of the strokes in the fourth row stored in the stroke storage unit 76 is updated.

After the update, it is determined whether all points constituting the strokes included in the assembly S1 are within the first area 61 (step S57). When the determination result is YES in step S57, the data in the second row stored in the stroke storage unit 76 is updated to express that all strokes included in the assembly S1 belong to the first area 61 (step S58). When the determination result is NO in step S57, the data in the second row stored in the stroke storage unit 76 is updated to express that all strokes included in the assembly S1 belong to the second area 62 (step S60).

Next, the process proceeds from step S58 or step S60 to step S59, and the draw change unit 83 causes the display output unit 25 to draw once again, on the display device 21, all strokes present in the present page of each of the first area 61 and the second area 62, based on the information in the fourth row stored in the stroke storage unit 76.

In FIG. 11A, the character string 65 (strokes) surrounded by the rectangular box 66 drawn by dashed-dotted lines is the movement target. In FIG. 11B, all points constituting the character string 65 are included in the second area 62, and therefore, this stroke is determined as being present in the second area 62. In FIG. 11C, the character string 65 is present across the first area 61 and the second area 62, and therefore this stroke is stored in the stroke storage unit 76 as being present in the second area 62.

Modification of Third Embodiment

Figure 14A:
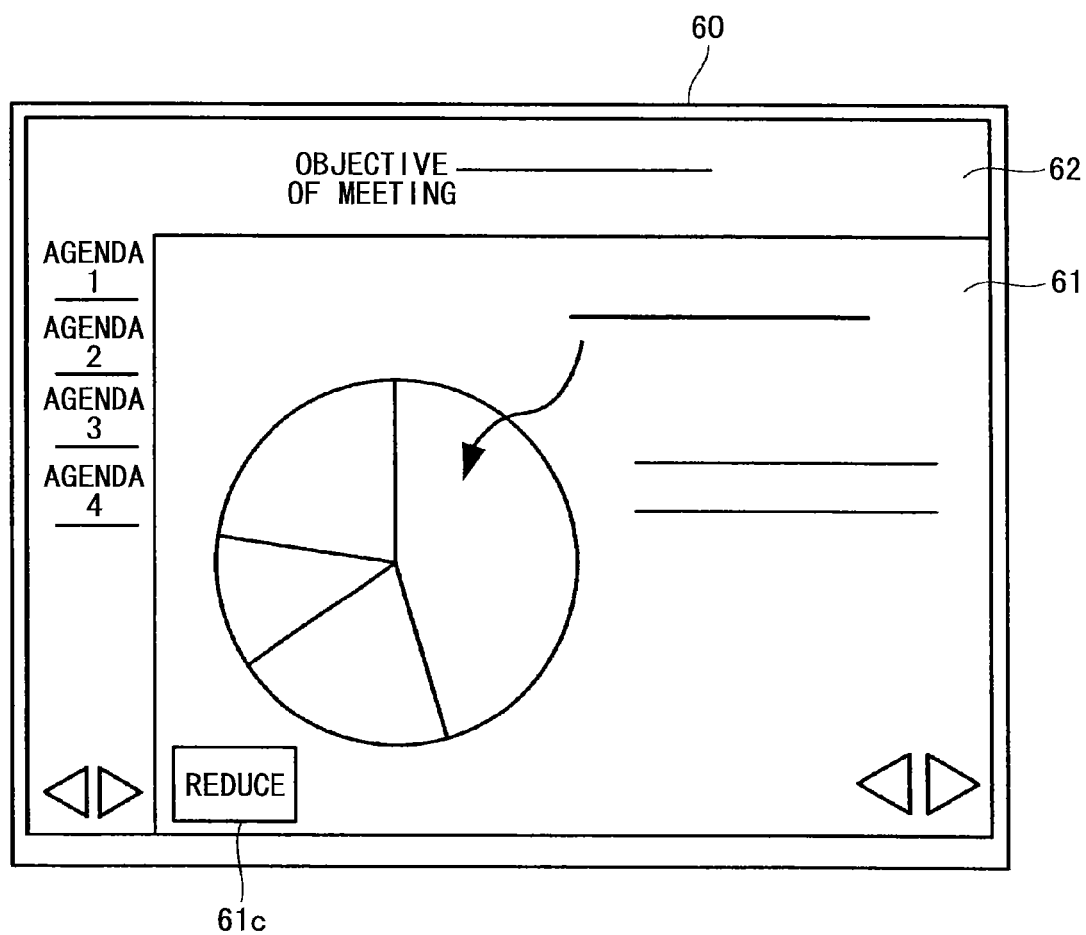
FIGS. 14A and 14B are for describing an example of a process performed by the draw change unit when reducing a stroke in a screen displayed on the display device of the information processing device according to the third embodiment of the present invention.
Figure 14B:
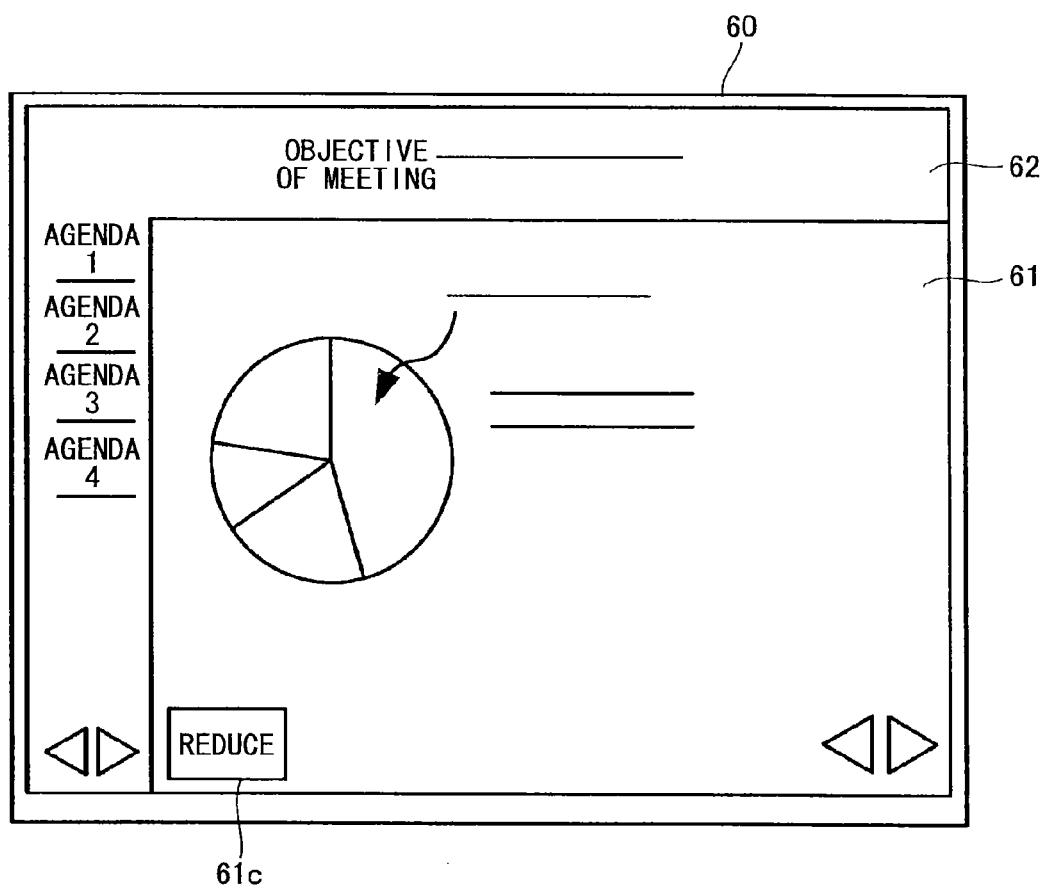

FIGS. 14A and 14B show another example of a screen displayed on the display device 21 of the information processing device 80 according to the third embodiment of the present invention. In this example, it is possible to reduce the size of the stroke in each of the areas 61 and 62 in the display screen 60. The configuration of the screen in FIGS. 14A and 14B is formed by adding a function of reducing the display contents in the display screen 60 as described below, to the draw change unit 83 of the information processing device 80 according to the present embodiment shown in FIG. 12.

In the example of the display screen 60 in FIGS. 11A through 11C, the "move" button 61s is provided at the bottom left of the first area 61. In the display screen 60 of FIGS. 14A and 14B, at the position of the "move" button 61s, instead of the "move" button 61s, there is provided a "reduce" button 61c. Furthermore, the draw change unit 83 executes the following operation in addition to, or instead of the function when pressing the "move" button 61s as described above.

When the user touches the "reduce" button 61c, the draw change unit 83 switches to the draw change mode based on information from the operation input unit 23 and the coordinate input unit 22. At the same time, based on information from the operation input unit 23 and the coordinate input unit 22, the draw change unit 83 acquires the page number of the present first area 61 from the present page storage unit 77, refers to the data stored in the stroke storage unit 76, and acquires the coordinate data of all points of all strokes present in the present page number of the first area 61.

Next, the draw change unit 83 performs a process on the acquired coordinate data of all points of the strokes, to reduce the length of each stroke in the X axis direction and the Y axis direction by a predetermined reduction ratio. Accordingly, data of new point coordinates is calculated, and the data of the present page storage unit 77 is updated by the new data. For example, assuming that the reduction ratio is 0.7, the positions of the new coordinates in the X axis direction and the Y axis direction of the stroke after reduction is obtained by the following formula.

(original coordinate value−100)×0.7+100=new coordinate value

Next, the draw change unit 83 acquires the updated data of the present page storage unit 77, and based on this updated data, the draw change unit 83 causes the display output unit 25 to draw a predetermined stroke again on the display device 21. Accordingly, the draw change unit 83 ends the draw change mode.

By performing the reduction process as described above, an empty space can be created in the area, where a new object can be handwritten.

In the above example of reduction, the reduction targets are all strokes in a predetermined area, like the first area 61. Instead, by the following operation, a desired stroke may be selected and the selected stroke may be reduced.

When the user touches the "reduce" button 61c, the draw change unit 83 switches to the draw change mode according to information from the operation input unit 23 and the coordinate input unit 22. In this state, when the user performs a drag operation on the touch panel, the draw change unit 83 acquires, from the coordinate input unit 22, coordinates (X1, Y1) corresponding to the start position of the drag operation, and acquires coordinates (X2, Y2) corresponding to the end position of the drag operation. At the same time, the draw change unit 83 acquires information relevant to the area to which the coordinates identified by the area determination unit 26 belong, and acquires the present page number of each area from the present page storage unit 77.

Next, the draw change unit 83 refers to all strokes in the present page in each area, among the stroke IDs stored in the stroke storage unit 76, and extracts an assembly S1 of all strokes whose coordinates of all points constituting the stroke (information in fourth row) are present inside a rectangular area formed by connecting the four points of (X1, Y1), (X1, Y2), (X2, Y2), (X2, Y1) with linear lines. Accordingly, the stroke to be reduced is activated.

In this state, when the user presses the "reduce" button 61c again, the activated stroke is reduced by a predetermined reduction ratio. For example, the reduction is performed as follows. The draw change unit 83 performs a process on the coordinate data of all points of the activated strokes, to reduce the length of each stroke in the X axis direction and the Y axis direction by a predetermined reduction ratio. Accordingly, data of new point coordinates is calculated, and data of a predetermined stroke in the data of the present page storage unit 77 is updated by the new data. For example, assuming that the reduction ratio is 0.7, the positions of the new coordinates in the X axis direction and the Y axis direction of the stroke after reduction is obtained by the following formula.

(original coordinate value−100)×0.7+100=new coordinate value

Next, the draw change unit 83 acquires the updated data of the present page storage unit 77, and based on this updated data, the draw change unit 83 causes the display output unit 25 to draw a predetermined stroke again on the display device 21. Accordingly, the draw change unit 83 ends the draw change mode.

According to one embodiment of the present invention, an information processing device and an information processing method are provided, by which characters/drawings can be drawn across plural areas obtained by dividing a screen such that the areas can be separately switched, the characters/drawings drawn across areas that are not switched can be left unmodified in the screen when any one of the plural areas is switched, and characters and drawings can be easily moved across areas.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The information processing device and information processing method are not limited to the specific embodiments described herein, and variations and modifications may be made without departing from the scope of the present invention.

The present application is based on and claims the benefit of priority of Japanese Priority Patent Application No. 2012-135392, filed on Jun. 15, 2012, the entire contents of which are hereby incorporated herein by reference.

What is claimed is:

1. An information processing device comprising:
    an input operation function identification unit configured to identify an input operation and a function performed on a display screen including at least two areas;
    an area determination unit configured to determine an area among the at least two areas of the display screen to which the input operation belongs, information corresponding to the input operation being associated with a page number corresponding to the area determined by the area determination unit;
    a function process unit configured to execute a process of the function corresponding to the input operation, with respect to the area determined by the area determination unit;
    a display output unit configured to display, on the display screen, a result obtained by the process executed by the function process unit;
    a storage unit configured to store, in association with each other, the page number of a page displayed on the display screen and information relevant to a stroke drawn on the display screen; and
    a page switch management unit configured to read, from the storage unit, the page number corresponding to the area determined by the area determination unit, and update the information relevant to the stroke to be stored in association with the page number.

2. The information processing device according to claim 1, wherein
    when the function identified by the input operation function identification unit is page switching, the page switch management unit reads, from the storage unit, the page number of the area determined by the area determination unit, replaces the page number with a new page number identified by the input operation, and reads, from the storage unit, the information relevant to the stroke stored in association with the new page number.

3. The information processing device according to claim 1, wherein
    the display screen includes a touch panel, and
    the touch panel includes the input operation function identification unit configured to identify a position of the input operation displayed on the display screen and a selected function.

4. The information processing device according to claim 1, wherein
    the input operation function identification unit identifies a position of the input operation on the display screen according to coordinates of the display screen.

5. An information processing method comprising:
    identifying an input operation and a function performed on a display screen including at least two areas;
    determining an area among the at least two areas of the display screen to which the input operation belongs, information corresponding to the input operation being associated with a page number corresponding to the area determined at the determining;
    executing a process of the function corresponding to the input operation, with respect to the area determined at the determining;
    displaying, on the display screen, a result obtained by the process executed at the executing;
    storing, in association with each other, the page number of a page displayed on the display screen and information relevant to a stroke drawn on the display screen; and
    reading the page number corresponding to the area determined at the determining, and updating the information relevant to the stroke to be stored in association with the page number.

6. The information processing method according to claim 5, wherein
    when the function identified at the identifying is page switching, the reading includes reading the page number of the area determined at the determining, replacing the page number with a new page number identified by the input operation, and reading the information relevant to the stroke stored in association with the new page number.

7. The information processing method according to claim 5, wherein
    the identifying includes identifying the input operation and the function performed on the display screen that includes a touch panel by which a position of the input operation displayed on the display screen and a selected function are identified.

8. The information processing method according to claim 5, wherein
    the identifying includes identifying a position of the input operation on the display screen according to coordinates of the display screen.

9. A non-transitory computer-readable recording medium storing a program that causes a computer to execute an information processing method, the information processing method comprising:
    identifying an input operation and a function performed on a display screen including at least two areas;
    determining an area among the at least two areas of the display screen to which the input operation belongs, information corresponding to the input operation being associated with a page number corresponding to the area determined at the determining;
    executing a process of the function corresponding to the input operation, with respect to the area determined at the determining;

displaying, on the display screen, a result obtained by the process executed at the executing;

storing, in association with each other, the page number of a page displayed on the display screen and information relevant to a stroke drawn on the display screen; and reading the page number corresponding to the area determined at the determining, and updating the information relevant to the stroke to be stored in association with the page number.

* * * * *